Dec. 21, 1965   J. C. CLARK   3,224,703
SPOOL OSCILLATING MECHANISM FOR SPINNING REEL
Filed Oct. 25, 1962   2 Sheets-Sheet 1
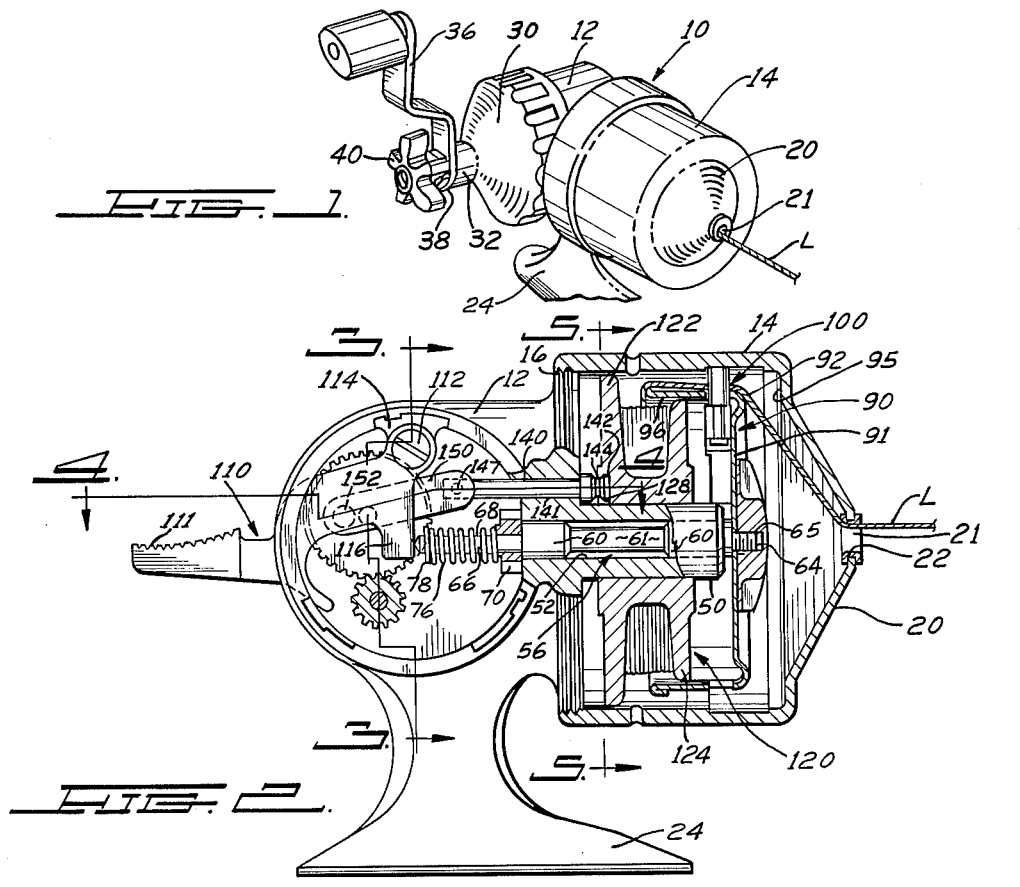
FIG. 1.
FIG. 2.
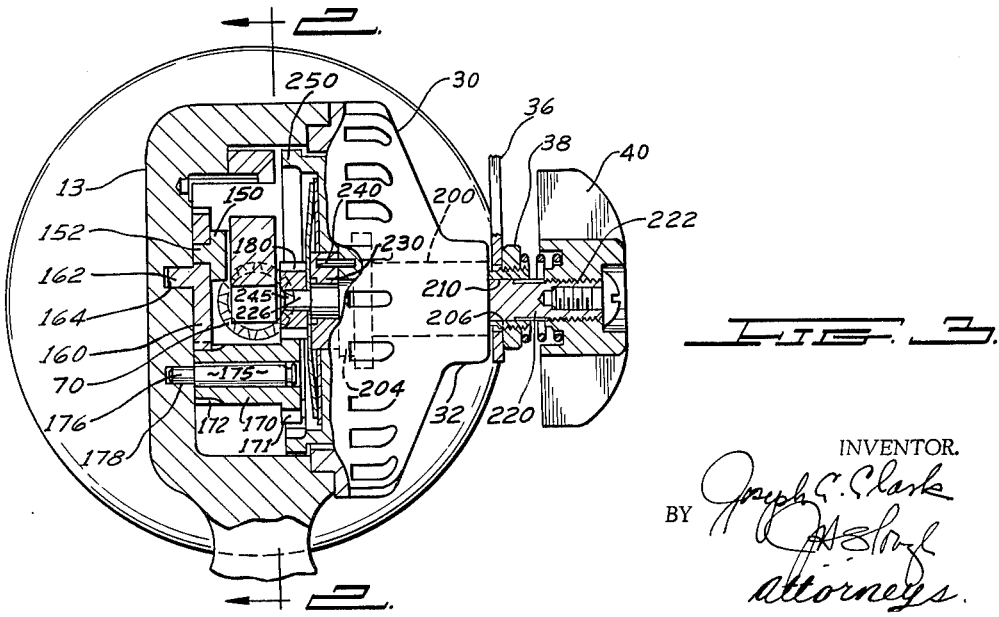
FIG. 3.
INVENTOR.
Joseph C. Clark
BY
Attorneys.

Dec. 21, 1965          J. C. CLARK          3,224,703
SPOOL OSCILLATING MECHANISM FOR SPINNING REEL
Filed Oct. 25, 1962                    2 Sheets-Sheet 2
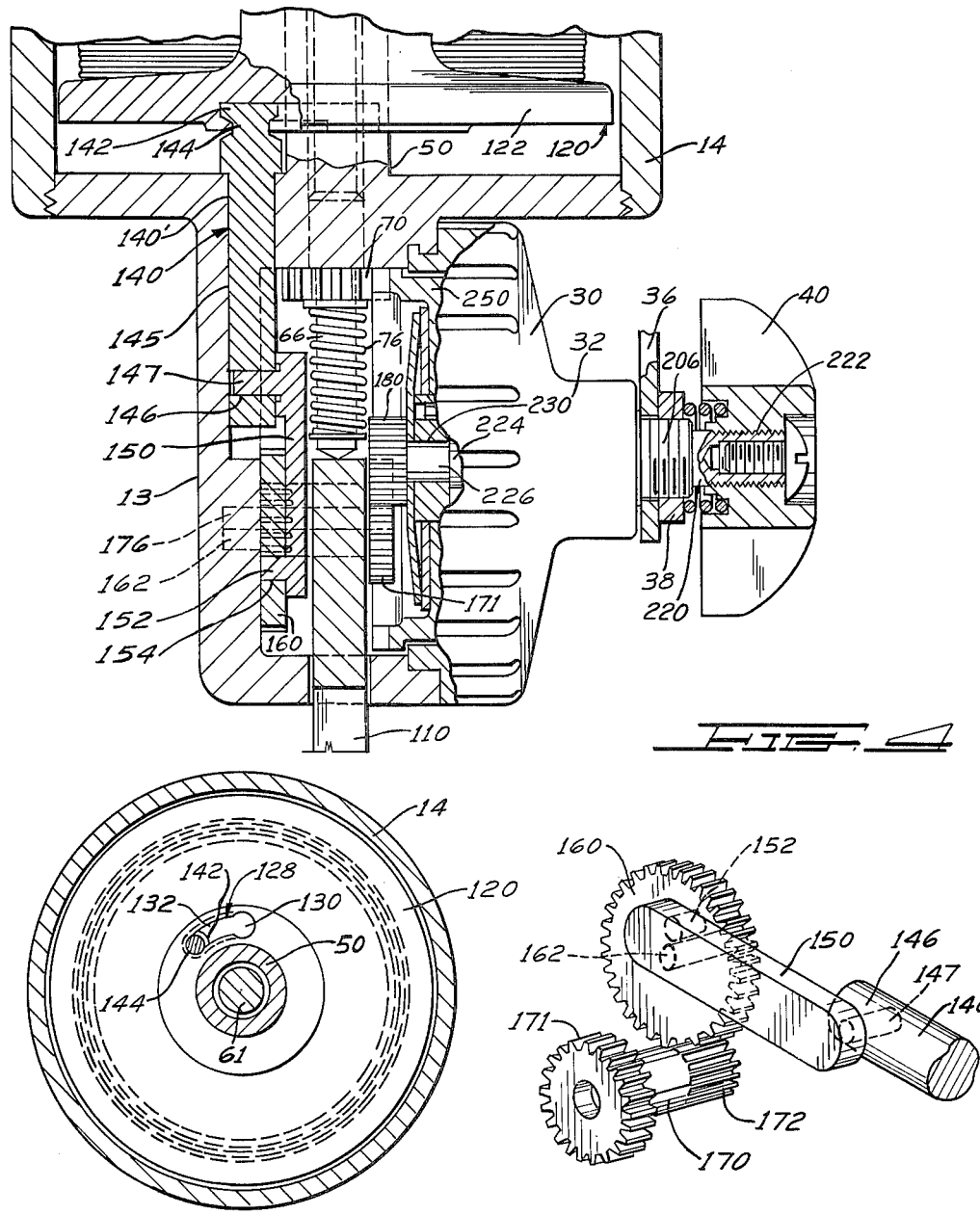
INVENTOR.
Joseph P. Clark
BY
attorneys

United States Patent Office 3,224,703
Patented Dec. 21, 1965

3,224,703
SPOOL OSCILLATING MECHANISM FOR
SPINNING REEL
Joseph C. Clark, Orlando, Fla., assignor to True Temper
Corporation, Cleveland, Ohio, a corporation of Ohio
Filed Oct. 25, 1962, Ser. No. 232,941
4 Claims. (Cl. 242—84.21)

This invention relates in general to fishing reels and relates more particularly to fishing reels of the type known as spinning reels wherein the fishing line is level wound onto a line-receiving spool. As is well known in the art, level winding of the line onto the spool is highly desirable to prevent the line from becoming entangled between the spool and the line-winding member.

An object of my invention is to provide a level wind mechanism structurally interposed between the handle operated main driving shaft and the spool whereby rotational movement of said shaft is converted by said mechanism to axial reciprocation of said spool.

Another object is to provide an improved level winding mechanism wherein a gearing arrangement is employed to axially reciprocate said spool.

Yet another object of my invention is to provide a level winding mechanism for axially reciprocating the spool wherein the mechanism can be quickly and easily disengaged from said spool in the event the latter is desired to be replaced.

Still another object is to provide a level winding mechanism that occupies but limited space in the reel housing and can therefore be incorporated into spinning reels without limitation as to size.

Another object of my invention is to provide a level winding mechanism that is easily assembled or disassembled, is inexpensive to manufacture, and is highly efficient in use.

These and other objects of my invention will become more readily apparent from the ensuing specification and accompanying drawings, in which:

FIG. 1 is a perspective view of a spinning reel assembly having associated therewith the novel spool oscillating mechanism of my invention;

FIG. 2 is a vertical sectional view of the spinning reel of FIG. 1, clearly showing the spool oscillating mechanism of my invention, and is taken on line 2—2 of FIG. 3;

FIG. 3 is a vertical section taken on line 3—3 of FIG. 2, more clearly showing the manner in which certain parts of the spool oscillating mechanism are mounted on the reel housing member;

FIG. 4 is a horizontal sectional view taken on line 4—4 and showing, in enlarged form, the spool oscillating mechanism;

FIG. 5 is a vertical sectional view taken on line 5—5 of FIG. 2 and shows the manner in which the spool is connected to the level winding mechanism of my invention; and FIG. 6 is a perspective view more clearly showing the components of my novel spool oscillating mechanism.

Referring now to the drawings, in which all like parts are designated by like reference characters, a spinning reel having associated therewith the novel spool oscillating mechanism of my invention is generally indicated at 10 and comprises a housing which consists of a main housing member 12 and a forward housing member or shroud 14. As noted in FIG. 2 the shroud 14 is threadedly secured to the main housing member 12 at 16. The shroud 14 has a conical shaped forward portion 20 having a central opening 21 formed in the most forward portion thereof adapted to receive an eyelet 22. In a well known manner the fishing line L flows into or away from the spinning reel 10 through the eyelet 22, as shown in FIG. 2.

A cover plate member 30 is secured to the main housing member 12 and combines with housing 12 to form an opening in which the driving mechanism, the drag assembly, and the spool oscillating mechanism of my invention are positioned. As shown in FIG. 1, the back plate member 30 has a centrally positioned integral hub member 32 extending outwardly therefrom. Spaced outwardly from the hub 32 is a handle or crank 36, a handle nut 38, and a drag knob 40.

Extending downwardly and forming an integral part of the main housing member 12 is a base member 24 which is adapted to be seated in a fishing rod by means of a conventional reel seating arrangement, which forms no part of the instant invention and which has been omitted for purposes of clarity.

Referring now to FIG. 2, the main housing member 12 has a preferably integrally formed forwardly extending cylindrical portion 50, the cylindrical portion 50 having an opening 52 extending therethrough adapted to receive a driven shaft generally indicated at 56, the latter being loosely mounted in said opening 52 for rotative and reciprocal movement relative to the cylindrical portion 50.

The shaft 56, as illustrated, comprises a pair of relatively large diameter portions 60 of a diameter slightly less than that of the opening 52 and a reduced diameter central portion 61 and a reduced forward end portion 64 and a reduced rearward portion 66. The reduced portions 60 and 66, as shown, are flatted on the upper surfaces thereof as shown at 65 and 68, respectively. The flatted surfaces 65 and 68 are provided to accommodate the winding drum 90 and gear 70 respectively, which have openings corresponding in shape to the flatted shaft portions. The winding drum 90 and the gear 70 are mounted in non-rotative relation to the shaft 56 whereby rotation of the gear 70 rotates the said shaft and winding drum.

Telescoped about the reduced diameter portion 66 of the shaft 56 is a coil spring 76 which is adapted to abut at its forward end portion the gear 70 and at its outer end convolution against a retaining ring 78, said retaining ring being retained in a groove on the shaft portion 66 in conventional manner.

The winding drum 90 comprises an annular front wall 91 and a rearwardly extended flange 96, said wall and said flange preferably having interposed therebetween a beaded surface 92. The winding drum 90, on the front wall 91 thereon, carries a line-winding or pickup means, generally indicated at 100, which can alternately be withdrawn into non-line-engaging position or extended, as shown in FIG. 2, into line-engaging position. The structure and function of the pickup means 100 forms no part of the instant invention, the same having been particularly described and claimed in my co-pending United States application, S.N. 233,000, filed October 25, 1962.

A thumb lever 110 having a manually operable end 111 projecting outwardly of the housing 12 is pivotally mounted within the said rear housing member 12 by means of a pin 112 which extends through aligned openings in a forward portion of the thumb lever 110 and a bracket 114 depending downwardly therefrom and integral with the main housing member 12. Said thumb lever 110 further is provided with a downwardly depending leg 116 which is adapted to contact the rearmost end of the shaft 56 whereupon when the thumb lever portion 111 is depressed the lever pivots about the pin 112 moving the leg 116 forwardly thereby moving the shaft 56 forwardly, or to the right, as shown in FIG. 2. Forward movement of the shaft 56 causes the pickup means 100 to be withdrawn as will be further explained hereinbelow and, upon further forward movement of the shaft 56 causes the fishing line to be snubbed by means of engagement of the annular beaded surface 92 of the winding drum 90 with outer peripheral surfaces 95 on the inner face of the shroud 14, as shown in FIG. 2.

Referring now to the novel spool oscillating mechanism of my invention, a spool member generally indicated at 120 is loosely mounted on the spindle portion 50 of the housing member 12. The spool 120, as shown, is provided with flange portions of circular shape, 122 and 124, the flange 122 being of relatively large diameter and the flange portion 124 being of relatively smaller diameter. The winding member 90 is disposed over the flange 124 in spaced relation thereto. The spool member 120 is provided with an arcuate groove 128 formed in the rear face of the flange 122, adapted to receive the forward end of a spool anchor 140, which forms part of my novel spool oscillating mechanism. Referring to FIG. 5, the groove 128 is eccentrically disposed adjacent the inner periphery of the circular flange 122 and is provided with an enlarged circular recess 130 and an arcuate portion 132 of relatively lesser radial dimension. The spool anchor 140, as shown, consists of a circular shaft portion 140' having a reduced neck portion 144 and an enlarged circular head portion 142. The portion 142 is of slightly less dimension than the enlarged circular end 130 of the groove 128 and the neck portion 144 is adapted to be received within the elongated arcuate recessed groove portion 132. When the enlarged end 142 of the anchor is disposed within the circular portion 130 of the groove 128 and the spool 120 rotated in a clockwise direction, the spool anchor pin 140 moves in the arcuate groove portion to a position as shown in FIG. 5 and the spool is locked against any rotative movement. It is to be noted that the spooling member 120 is easily connected and disconnected from the anchor pin 140 and that different size spools may be interchanged, if desired. It will thus be seen that reciprocal movement of the spool anchor 140 will likewise cause reciprocal movement of the spooling member 120.

As shown in FIGS. 2 and 4, the spool anchor 140 is loosely mounted for reciprocation in an opening in the main housing member 12 and is provided adjacent its rearward end thereof with a cylindrical opening 146 within which a cylindrically pin 147, projecting laterally of a preferably integrally formed in a link member 150, is seated. The pin 147 is loosely mounted within the opening 146 in the anchor rod 140 whereby, upon movement of the link 150, as hereinafter described, occasioned by the rotation of the gear 160, produces longitudinal reciprocation of the anchor rod 140. The transfer link 150, it will be noted, is provided at its opposite or rearward end with pin means 152 loosely mounted eccentrically in a cylindrical opening 154 in the crank gear 160.

As best shown in FIG. 4, a side wall 13 of the main housing 12 is provided with a longitudinally extending semicircular guide opening 145 within which a portion of the spool anchor 140 is slidingly seated during reciprocation. The provision of a guide opening, such as 145, in the wall of the casing, for the spool anchor 140, provides a spool oscillating assembly which requires but a minimum of space within the casing, and does not interfere with the normal positioning of the line wind and drive means mounted therein.

The crank gear 160 is mounted on the rear wall 13 of the housing 12 by pin means 162 disposed in an opening 164 in the said rear wall. As hereinbefore described, rotation of the crank gear 160 causes the transfer link 150 mounted thereon to be rotated about the center of rotation, namely the pin 162 of the crank gear 160. The crank gear 160, it will be noted, is in meshed engagement with spur gear 172 of idler wheel 170. As shown in FIGS. 3, 4 and 6, the idler wheel 170 comprises a pair of spur gears, the gear 172 being of relatively less diameter than the gear 171. The spur gear 171 meshingly engages a spool driving gear 180 mounted on the handle drive shaft. The idler wheel 170 is adapted to be rotatably mounted upon a shaft 175 secured to the casing 13, said shaft being parallel to the pin 162. It will thus be seen that rotation of the spool driving gear 180, as hereinafter described, rotates the idler wheel 170, rotating the crank gear 160, and causing reciprocal movement of the spool anchor rod 140 and of the spool member 120 associated therewith, effecting level winding of the fishing line carried by the spool.

The cover plate 130 for the casing 13 and its hub 32 are provided with a centrally disposed opening 200. A crank sleeve 204 is mounted within the opening 200 and is provided with a relatively reduced threaded end portion projecting outwardly of the hub and an enlarged annular portion on its opposite end. As clearly shown in FIG. 4, the handle 36 and handle nut 38 are threadedly secured to the threaded end portion 206 of the crank sleeve 204. Mounted within an opening 210 in the crank sleeve 204 is a drive shaft 220 carrying at its outermost externally threaded end 222, a drag nut 40, and at its innermost end a pair of stepped portions 224 and 226. The spool driving gear 180 is, it will be noted, mounted on the reduced end portion 226 of the drive shaft 220, and is adapted to be rotated by the handle 36. A bushing 230 for said gear 180 is non-rotatably keyed to the step portion 224 of the said shaft 220 and is drivingly connected to the crank sleeve 204 through a plurality of pins 240 disposed in aligned openings in the crank sleeve 204 and the gear bushing 230. It will thus be seen that rotation of crank sleeve 204 will cause corresponding rotation of the gear bushing 230 through the pins 240. It will further be seen that since the gear bushing 230 is non-rotatably mounted upon the shaft 220, the shaft 220 will likewise be rotated when the crank sleeve 204 is rotated. The gear 180 and gear bushing 230 are secured to the shaft 220 by rivet means, not shown.

A main driving gear 250 is rotatably mounted on the gear bushing 230, as shown in FIG. 4, and is adapted to be driven upon rotation of the handle 36 and the crank sleeve 204, in conventional manner or, as illustrated, by improved clutch and drag means, as specifically described and claimed in copending United States application S.N. 233,000 filed October 25, 1962, assigned to the assignee of the instant application, wherefor further reference thereto is deemed unnecessary.

In operation, the improved spool oscillating means of my invention is effected in the following manner.

The rotation of the handle 36 causes rotation of the spool oscillating gear 180 carried by the drive shaft 220 through crank sleeve 204 and gear bushing 230. Rotation of the spool driving gear 180 causes rotation of the idler wheel 170 wherefor spur gear 172 of the idler wheel 170, meshing with gear 160, rotates the same. Since the transfer link 150 is eccentrically mounted on the gear 160, said link rotates about the axis of rotation of said gear and movement of said transfer link 150 causes the spool anchor rod 140 to be reciprocated. Since the forward end of the spool anchor 140 is connected to the spooling member 120, reciprocation of the spool anchor 140 causes reciprocation of the spooling member 120, thereby level winding the line onto the spool.

It should be apparent that numerous changes can be made from the description and drawings contained herein, without, however, departing from the invention illustrated and described.

What I claim as my invention is:

1. In a fishing reel of the character described comprising a housing having a circular recessed gear housing member, said member having an integrally formed circular disk disposed forwardly thereof having a cylindrical portion of reduced diameter extending forwardly of the said disk and integrally formed therewith, said disk and cylindrical portion being provided with a bore therethrough, a line-carrying spool member loosely mounted on said cylindrical portion, a driven shaft rotatable and axially movable through said bore and extending therethrough, winding means for winding said line on said spool member, an apertured cover plate member covering a side of said recessed gear housing member, handle means mounted adjacent said cover plate and operatively connected by a drive shaft to said driven shaft for rotating said shaft, said disk being provided with an opening through said disk laterally of and in spaced relation to the said bore, spool anchor means reciprocably mounted in said laterally disposed opening in said disk, the said spool member having a rearwardly disposed circular flange, said flange being provided with an arcuate groove terminating in an enlarged circular recess, said groove being concentric with the bore in the cylindrical portion upon which the spool is mounted and in spaced adjacent relation therewith, said spool anchor means comprising an anchor pin and a link member, said pin secured to a forward end of said link member and to said spool, a portion thereof adapted to project into the said circular recess in the said spool flange, rotation of the spool flange in one direction locking the spool anchor in secure seating in said groove and preventing further rotative movement of the spool, rotation of the flange in an opposite direction disengaging the anchor and said spool, gear transmission means driven from the said drive shaft, said link eccentrically secured to a spool oscillating gear of the gear transmission means mounted to a side wall of said recessed gear housing opposite said cover plate member wherefor rotation of said handle means causes rotation of said spool oscillating gear rotating an end of the said link causing the pin to reciprocate and causing reciprocation of the spool member and level winding the line onto the spool.

2. In a fishing reel, as claimed in claim 1, said disk being externally threaded, a shroud having a conical shaped nose portion having a central opening through which said fishing line passes being internally threaded adjacent its rearward end and adapted to be threadedly secured to said externally threaded disk.

3. In a fishing reel, as claimed in claim 1, said spool anchor pin having a reduced neck portion and an enlarged circular head portion, the neck portion adapted to be received within the arcuate groove and said enlarged head portion being adapted to be received in the circular recess in said spool flange.

4. The combination of claim 1 wherein said gear transmission means has a pair of gears, a said gear intermeshing with said spool oscillating gear and the other gear intermeshing with a face gear carried by said drive shaft.

References Cited by the Examiner

UNITED STATES PATENTS

| | | | |
|---|---|---|---|
| 2,586,921 | 2/1952 | Delphon | 242—84.21 |
| 2,680,575 | 6/1954 | Hayes | 242—84.21 |
| 2,745,607 | 5/1956 | Taggart et al. | 242—84.21 |
| 3,022,961 | 2/1962 | Sawamura et al. | 242—84.21 |
| 3,074,665 | 1/1963 | Marrow | 242—84.21 |
| 3,084,885 | 4/1963 | Hornbostel | 242—84.21 |
| 3,085,766 | 4/1963 | Salmivuori | 242—84.21 |

FOREIGN PATENTS 969,584   5/1950   France.

MERVIN STEIN, *Primary Examiner.*

RUSSELL C. MADER, *Examiner.*

B. S. TAYLOR, *Assistant Examiner.*